United States Patent [19]

Sygnator

[11] 3,724,315

[45] Apr. 3, 1973

[54] EXTRUDING SCREW

[75] Inventor: Henry A. Sygnator, Arlington Heights, Ill.

[73] Assignee: Illinois Wool Works Inc., Chicago, Ill.

[22] Filed: Sept. 7, 1971

[21] Appl. No.: 177,950

[52] U.S. Cl. .................................................. 85/47
[51] Int. Cl. ............................................. F16b 25/00
[58] Field of Search .................. 85/41, 47; 10/152 T

[56] References Cited

UNITED STATES PATENTS

| 2,703,419 | 3/1955 | Barth | 10/152 T |
| 3,156,152 | 11/1964 | Reed | 85/41 |
| 3,438,299 | 4/1969 | Gutshall | 85/41 |

*Primary Examiner*—Edward C. Allen
*Attorney*—Thomas W. Buckman et al.

[57] ABSTRACT

The present invention relates generally to threaded fasteners and more particularly to extruding and/or thread-forming screw fasteners for application to sheet metal. An embodiment of the invention disclosed herein includes a shank having a threaded section, a head at one extremity, a pilot section at the opposite extremity in coaxial alignment with the threaded section and a work swaging substantially conical section interposed between the pilot and threaded shank sections. The conical section is positioned out of axial alignment with the threaded and pilot sections.

6 Claims, 12 Drawing Figures

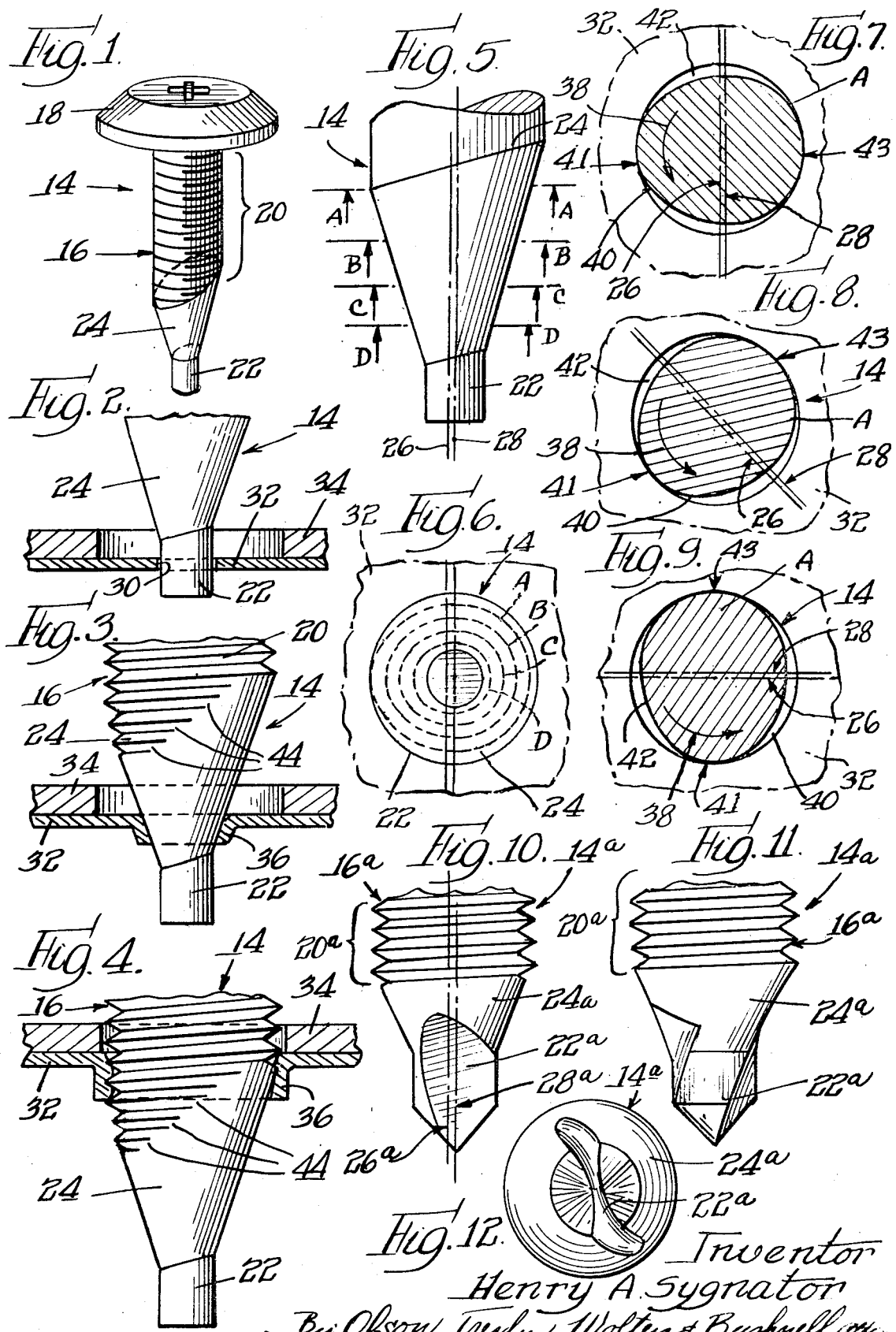

3,724,315

EXTRUDING SCREW

SUMMARY OF THE INVENTION

It is an important object of the present invention to provide a fastener of the above-mentioned type whereby the ease with which the fastener may be rotatably applied to an apertured metallic sheet is greatly facilitated.

More specifically, the present invention envisions a unique and improved extruding and/or thread-forming fastener equipped with an entering end of novel construction which serves to greatly reduce the rotative force required to apply the fastener to an apertured workpiece.

Still more specifically, the present invention contemplates the provision of a novel and practical extruding and/or thread-forming screw fastener which will enhance the ease with which the sheet material in the vicinity of the screw accommodating aperture may be swaged to provide an axial extrusion in which thread convolutions subsequently may be formed.

It is a further object of the present invention to provide an extruding and/or thread-forming screw fastener of the type set forth above wherein the novel work swaging section of the fastener may be formed economically by the application of cold heading dies and the like.

BRIEF DESCRIPTION OF THE DRAWING

The foregoing and other objects and advantages will be more apparent from the following detailed description when considered in connection with the accompanying drawing wherein:

FIG. 1 is a perspective view of an extruding and/or thread-forming screw fastener of the type contemplated by the present invention;

FIG. 2 is a fragmentary elevation of the lower extremity of the fastener of FIG. 1 as said fastener is initially inserted within a work aperture;

FIG. 3 is a view similar to FIG. 2 disclosing the fastener after it has been further advanced into the worksheet so as to initiate the formation of an extrusion;

FIG. 4 is a view similar to FIG. 3 disclosing the fastener after it has completed the formation of an extrusion and has formed internal thread convolutions in said extrusion;

FIG. 5 is a fragmentary enlarged view of the entering extremity of a screw fastener formed with the novel conical swaging or work extruding extremity contemplated by the present invention;

FIG. 6 is a bottom view of the fastener shown in FIG. 5, dotted lines A, B, C and D illustrate the cross-sectional non-circular shape of the conical swaging section when viewed along the corresponding cross-sectional lines A, B, C and D in FIG. 5;

FIGS. 7 to 9, inclusive, semi-diagrammatically illustrate the position assumed by the non-circular section A when the screw is rotated as indicated by the directional arrow;

FIG. 10 is a fragmentary elevational view of the lower entering extremity of a modified form of thread-forming fastener equipped with a pilot in the form of a drill point;

FIG. 11 is an elevational view similar to FIG. 11 as seen from the right of FIG. 10; and FIG. 12 is a bottom view of the fastener in FIG. 11.

DESCRIPTION OF THE PREFERRED EMBODIMENTS

Referring now to the drawing wherein like numerals have been employed to designate similar parts throughout the various figures, it will be seen that one embodiment of a thread-forming screw fastener of the type envisioned by the present invention is designated generally by the numeral 14. The fastener 14 includes a shank 16 formed with a head 18 at one extremity. The shank 16 also includes a threaded section 20 and an entering cylindrical type pilot section 22 of reduced diameter. The threaded section 20 and the pilot section 22 are in axial alignment, namely coincident.

Positioned between the entering extremity of the threaded shank section 20 and the pilot section 22 is a work swaging or extruding conical section 24. Particular attention is directed to the fact that the central axis of the conical section 24 is out of alignment with or in other words is not coincident with the axis common to the threaded shank section 20 and the pilot 22. In FIG. 5 the axis of the swaging conical section 24 is designated by the numeral 26 and the axis common to the shank section 20 and pilot section 22 is designated by the numeral 28. The conical section 24 is also non-circular or generally elliptical in cross-section as illustrated by the dotted lines A, B, C and D of FIG. 6 corresponding with the shape of transverse sections taken respectively along the lines A, B, C and D of FIG. 5. Axis 26 generally represents the position of the longitudinal plane extending through points located midway of the maximum dimension of transverse planes taken through the work swaging section and indicates that one circumferential segment of the work swaging surfaces extends radially from the axis 28 a distance greater than the opposing circumferential segment.

In FIG. 2 the fastener 14 is disclosed in initial association with an aperture 30 formed in a workpiece or sheet 32. FIG. 2 also discloses a work sheet 34 adapted to be clamped against the workpiece 32 by the screw head 18. The work aperture 30 may be preformed by stamping or otherwise within the work sheet 32. As rotation and axial pressure is applied to the fastener 14, an extrusion 36 is initially swaged within the workpiece 32, FIG. 3. In FIG. 4, the extrusion of 36 is shown as completely formed and the convolutions of the threaded section 20 of the shank form or indent complementary thread convolutions along the inner wall of the extrusion. By applying further rotation to the fastener the clamping surface of the head 18 may be brought to bear against the workpiece 34.

In order more clearly to understand the functioning of the surface of the conical section 24 in developing the extrusion 36, reference is made to the semi-diagrammatic illustrations in FIGS. 7 to 9, inclusive. These views are taken from the bottom of the fastener 14 as it is rotated within the workpiece in a direction indicated by the directional arrow 38. It may be assumed that the cross-section shown in FIG. 7 corresponds with the dotted shape A of FIG. 6, which presents a tear drop or egg-shaped periphery. As shown in FIGS. 7 to 9, inclusive, extruding forces act in opposed areas of lesser and greater radii indicated respectively by numerals 41 and 43. During rotation of the screw in the direction designated by the directional arrow, the extrusion forces are exerted by the limited area 41 against the workpiece, with areas 40 and 42 free from swaging engagement with the workpiece. Area 43 having greater contact with the workpiece functions as an abutment oppositely disposed from the extruding limited surface area 41. With this limited area of contact between the periphery of the conical section 24 and the workpiece, rotative forces required to apply the fastener are greatly reduced, as compared with thread-forming screw fasteners heretofore available. FIGS. 8 and 9 disclose the successive positions assumed by the conical surface 24 of the non-circular or egg-shaped cross-section as the screw member is rotated from the position shown in FIG. 7 to the position shown in FIG. 9. The foregoing progressive, limited engagement of the surface area 41 with the workpiece is also experienced by the non-circular or generally elliptical surfaces indicated by the transverse sections B. C and D. The conical sections are formed with segmented or partial convolutions 44, FIGS. 3 and 4, which enhance the extruding capability of the fastener.

A modified embodiment of the invention is disclosed in FIGS. 10 to 12, inclusive. The fastener disclosed in these figures is designated generally by the numeral 14a and comprises a shank 16a provided with a threaded section 20a corresponding with the previously described threaded section 20. FIGS. 10 and 11 disclose only the entering portion of the fastener 14a in view of the fact that the only structural difference between the fastener 14a and the fastener 14 is in the provision of a pilot section 22a in the form of a drill point. Interposed between the drill point pilot 22a and the threaded section 20a is a conical section 24a. The conical section 24a like the previously described conical section 24 is non-circular and preferably egg-shaped in transverse cross-section, and the axis 26a thereof is out of alignment with the axis 28a which is the common axis of the threaded section 20a and the pilot drill point 22a. After the drill point 22a has formed an aperture in the workpiece, the conical swaging section 24a functions to form an extrusion as previously described.

From the foregoing it will be apparent that the present invention contemplates the provision of a novel and extremely practical extruding type screw fastener. The unique conical section of non-circular cross-section, with the axis thereof displaced from or out of alignment with the common axis of the threaded shank section and pilot materially enhances the ease with which the fastener may be applied to a workpiece. It will be apparent that the pilot point configuration can be varied to suit the intended application and still come within the intent of this invention. By providing conical sections 24 and 24a of egg-shaped or tear drop cross-sectional shape, the conical surface of smaller radius serves very effectively as an extruding surface. It will also be apparent that the axis of the conical section is laterally displaced with respect to the axis common to the threaded and pilot section in such a manner that a longitudinal plane determined by the maximum dimension or diameter of the conical section is substantially coincident with said common axis.

The invention is claimed as follows:

1. An extruding and thread forming screw fastener including a cylindrical shank, a head at one extremity of said shank, and a cylindrical pilot section of smaller diameter than said shank at the opposite entering extremity of said shank in coaxial alignment with the shank section and a work swaging portion interposed between said pilot section and said shank section, the lowermost extremity of the work swaging portion in the vicinity of its juncture with said pilot portion defining a plane at an acute angle to a plane perpendicular to the axis of the shank and pilot of said screw, the work swaging surface diverging upwardly and outwardly in substantially a conical configuration and defining at the juncture with said shank a plane substantially angularly disposed to the axis of said shank in the same direction as the plane at the juncture of the pilot portion and the work swaging surface, said shank provided with threads a portion of which threads extends downwardly toward the entering end into a circumferential segment of said work swaging portion in the vicinity of the portion of said plane nearest the entering end of the screw, a portion of the surface of said work swaging portion opposite said threaded segment being unthreaded and providing a swaging surface to extrude marginal portions of an aperture in a complementary workpiece into which said screw fastener is adapted to be rotated.

2. An extruding and thread-forming screw fastener as set forth in claim 1, wherein the conical section in transverse section is non-circular in shape.

3. An extruding and thread-forming screw fastener as set forth in claim 1, wherein the conical section in transverse section is generally oval in shape and wherein a longitudinal plane determined by the maximum transverse dimension of the conical section is substantially coincident with the axis of the fastener shank common to the threaded and pilot sections thereof.

4. An extruding and thread-forming screw fastener as set forth in claim 1 wherein the pilot section comprises a drill point extending axially from the entering extremity of the conical section.

5. An extruding and thread forming screw fastener as set forth in claim 1, wherein the radial distance from the axis of the screw to circumferential segments located on a transverse plane of the work swaging portion is not constant.

6. An extruding and thread forming screw fastener in accordance with claim 5, wherein the portion of the cross section of the work swaging section having the least radius coincides with the segment which is of the greatest radial distance from the axis of the screw.

* * * * *